(12) United States Patent
Helfer et al.

(10) Patent No.: US 7,287,901 B1
(45) Date of Patent: Oct. 30, 2007

(54) REVERSER MECHANISM FOR UNI-DIRECTIONAL ROTATIONAL DRIVING OF A WHEEL SET

(75) Inventors: Jean-Luc Helfer, Nidau (CH); Thierry Conus, Lengnau (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/695,701

(22) Filed: Apr. 3, 2007

(30) Foreign Application Priority Data

Apr. 7, 2006 (EP) .................................. 06007364

(51) Int. Cl.
*G04B 25/00* (2006.01)
*G04B 5/00* (2006.01)

(52) U.S. Cl. ...................................... 368/147; 368/207

(58) Field of Classification Search ........ 368/147–151, 368/206–210; 74/25, 89, 126, 434; 185/37–39, 185/40 A, 40 K
See application file for complete search history.

(56) References Cited

U.S. PATENT DOCUMENTS

| 2,645,319 | A | | 7/1953 | Robin | |
|---|---|---|---|---|---|
| 4,213,293 | A | * | 7/1980 | Mabuchi et al. | ............ 368/152 |
| 4,809,250 | A | * | 2/1989 | Meier | ......................... 368/208 |
| 6,409,379 | B1 | * | 6/2002 | Gabathuler et al. | ......... 368/150 |
| 6,814,483 | B2 | * | 11/2004 | Watanabe et al. | ........... 368/127 |
| 2001/0046187 | A1 | * | 11/2001 | Graemiger | .................. 368/190 |
| 2004/0130972 | A1 | * | 7/2004 | Watanabe et al. | ........... 368/148 |

FOREIGN PATENT DOCUMENTS

| CH | 305463 | 5/1955 |
|---|---|---|
| CH | 412 721 | 11/1963 |
| CH | 400 017 | 4/1966 |
| DE | 28 51 735 | 11/1978 |
| GB | 814535 | 9/1959 |
| JP | 18707/72 | 6/1972 |

OTHER PUBLICATIONS

European Search Report issued in corresponding application No. EP 06 00 7364 completed Jan. 26, 2007.

* cited by examiner

*Primary Examiner*—Vit W Miska
(74) *Attorney, Agent, or Firm*—Griffin & Szipi, P.C.

(57) ABSTRACT

The mechanism includes, mounted to rotate freely on an arbour 6, a driving wheel (5) driven by an oscillating drive pinion (3) and a driven wheel (7) meshed with the first wheel set (1) of a kinematic chain and comprising a dome (11) for housing a coupling device (10) comprising at least one bent locking arm (12) one end (14) of which has a pivoting point (14a, 14b) on the driving wheel (5) and the other end (16) of which has a point of abutment (16a) against the inner wall (2) of the dome (11) of the driven wheel (7) via the action of a spring (20) integral with said arm (12). The pivoting point (14b) preferably moves along a cam (21).

Application to automatic winding by an oscillating weight.

19 Claims, 6 Drawing Sheets

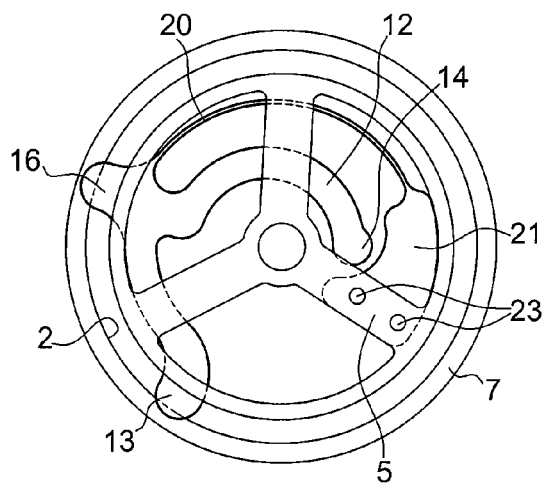
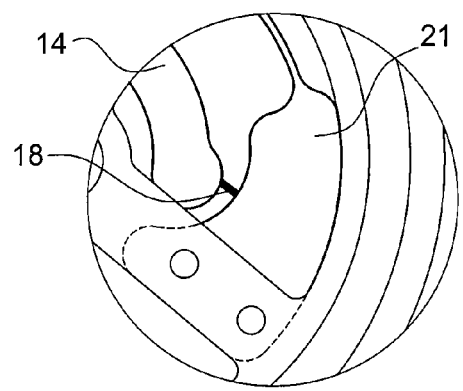
Fig. 10         Fig. 10A
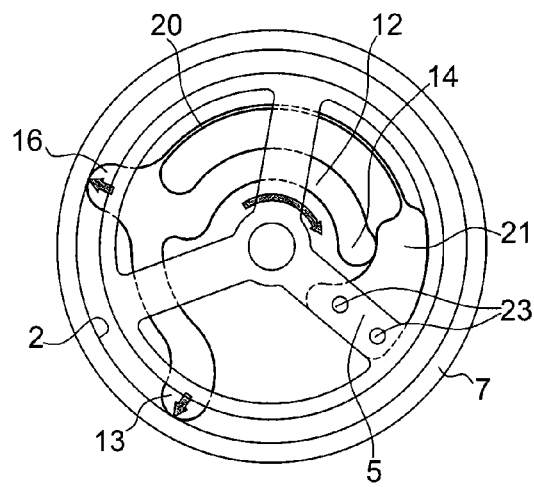
Fig. 11
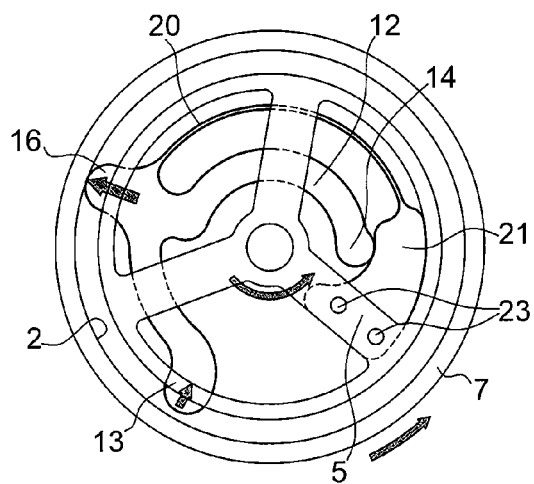
Fig. 12

REVERSER MECHANISM FOR UNI-DIRECTIONAL ROTATIONAL DRIVING OF A WHEEL SET

This application claims priority from European Patent Application No. 06007364.0. filed 7 Apr. 2006, the entire disclosure of which is incorporated herein by reference.

FIELD OF THE INVENTION

The present invention concerns a reverser mechanism that drives the first wheel set of a kinematic chain in a single direction, whatever the direction of rotation of the drive pinion. Such reverser mechanisms are used in particular for automatically winding the barrel spring of a mechanical watch, or for driving the generator of any small portable electronic apparatus, the drive pinion also being set in movement by an oscillating weight.

STATE OF THE ART

Numerous automatic winding devices using an oscillating weight and reverser mechanism have already been proposed. These devices rely on the principles of cam or lever-click mechanisms, gear change mechanisms on two meshed wheels, only one of which is a drive wheel, or roller mechanisms, as disclosed for example in CH Patent No. 305 463, or arms/clicks as disclosed for example in the Japanese Utility Model 18707/72. Such devices have the drawback of being relatively cumbersome and requiring the assembly of quite a large number of parts, and having high friction forces at high speeds when rotating in the authorized direction.

SUMMARY OF THE INVENTION

It is thus an object of the present invention to overcome the drawbacks of the aforecited prior art by providing a reverser mechanism comprising a smaller number of parts to be assembled and thus able to be produced at a lower cost, while having a higher or equal performance to that of the devices of the prior art.

Thus the reverser mechanism, inserted between the first wheel of a kinematic chain that has to be driven in a single direction and the drive pinion that has an alternate motion, comprises a driving wheel mounted on an arbour of rotation above a driven wheel mounted on the same arbour and meshed, directly or indirectly, with the first wheel of the kinematic chain. The driven wheel comprises a dome open towards the driving wheel for housing a coupling device, made of a resilient material, for coupling/uncoupling the two wheels as a function of the direction of rotation of the drive pinion. The coupling device is characterized in that it comprises at least one bent locking arm, one end of which has a pivot point on the driving wheel and the other end of which has a point of abutment against the inner wall of the dome of the driven wheel under the action of a spring that is integral with said arm.

According to a first embodiment, the arm pivots about a fixed arbour secured to the driving wheel, and according to a second embodiment, which will be explained in more detail hereinafter, the pivot point can move along a cam secured to the driving wheel.

In this "single direction" mechanism, and particularly in the second embodiment, providing a guide extension on the locking arm giving a third positioning point of said locking arm, a balance extension for reducing, or removing the unbalance, and/or a security device limiting the travel of the pivot point along the cam in case of too violent clearances, can further improve the working of the mechanism.

The reverser mechanism briefly described above is called a "single direction" mechanism because it only drives for one alternation of the drive pinion. It is however possible to have a "double direction" reverser mechanism by coupling two "single direction" reverser mechanisms having reverser coupling devices. In a preferred embodiment, the two reverser mechanisms are superposed and the two driven wheels form a single piece.

BRIEF DESCRIPTION OF THE DRAWINGS

Other features and advantages of the present invention will appear in the following description of various embodiments, given by way of non-limiting illustrative, with reference to the annexed drawings, in which:

FIG. 10 shows a simplified top view of the coupling device prior to assembly;

FIG. 10A shows a construction detail of FIG. 10;

FIGS. 11 and 12 explain the operation of the reverser mechanism;

DETAILED DESCRIPTION OF THE INVENTION

Figure 1:
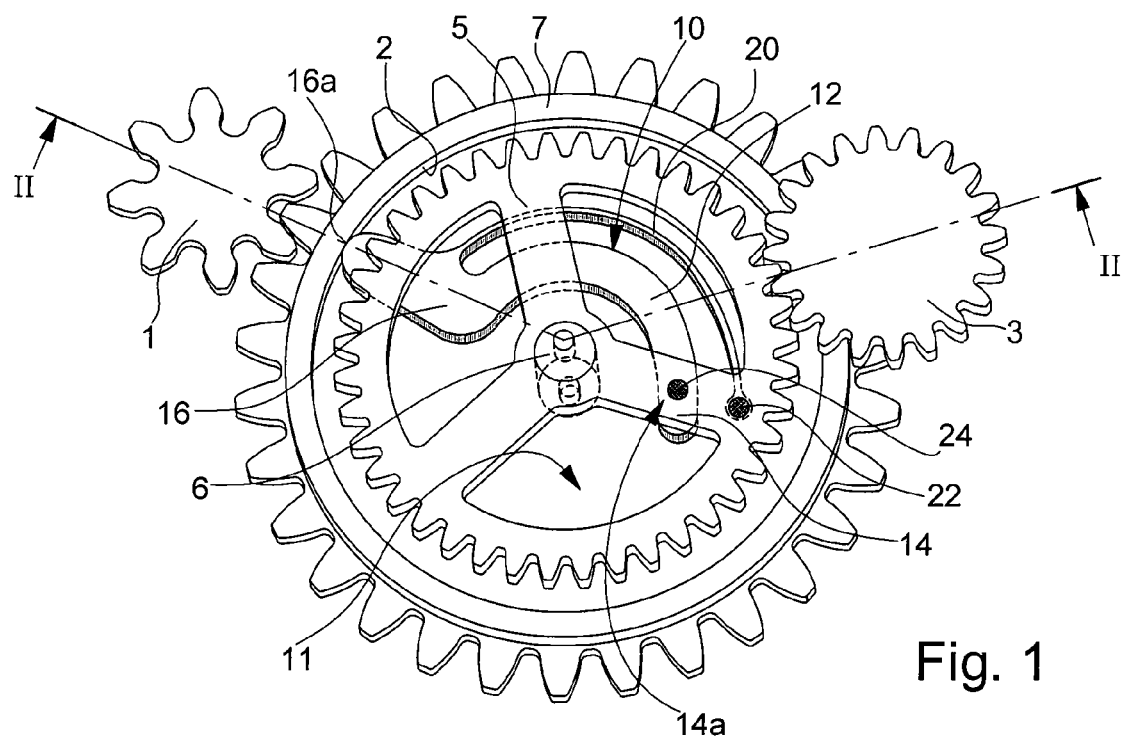
FIG. 1 is a perspective view of a first embodiment.
Figure 2:
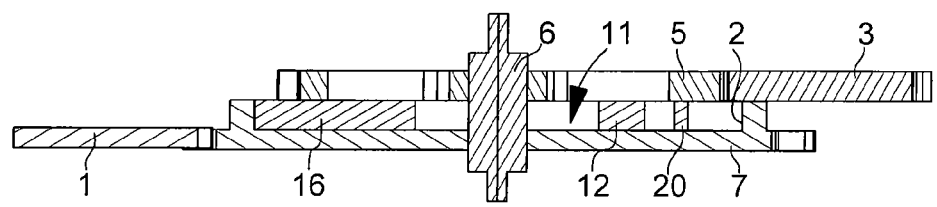
FIG. 2 is a broken cross-section along line II-II of FIG. 1.

Referring first of all to FIGS. 1 and 2, we will describe below a first embodiment of a reverser mechanism according to the invention, which will be illustrated by way of example by an automatic winding mechanism for a mechanical watch via an oscillating weight whose drive pinion 3 acts in a single direction to drive the first wheel set 1 of a kinematic reduction chain (not shown), the last wheel set of which is meshed with the barrel ratchet.

Drive pinion 3 of the oscillating weight meshes with a first toothed driving wheel 5 freely mounted on an arbour 6 pivoting between a plate and a bridge (not shown), or between any other armature for positioning the parts of a timepiece mechanism in relation to each other.

A second driven wheel 7 is positioned below drive wheel 5 and is also freely mounted on arbour 6 about which it rotates. It also comprises a toothing meshed with the first wheel set 1 of the kinematic chain.

Referring now to the cross-section of FIG. 2, it can be seen that drive wheel 7 comprises a dome 11 the opening of which is orientated towards drive wheel 5. This dome 11 is for housing a coupling device 10, the embodiment of which is described hereinafter.

Coupling device 10 basically comprises two parts, able to be made in a single piece, or to form two separate pieces.

The first part is formed by a locking arm 12 which, in this embodiment, is bent, one end 14 of which, designated the "foot", comprises a pivoting point 14*a* in driving wheel 5, for example about an arbour 24 driven in to said wheel. The other end 16 of arm 12, designated the "head" provides a point of abutment 16*a* against the inner wall 2 of dome 11. This abutment is provided by a spring 20 connecting head 16 and a point of attachment 22 in driving wheel 5. This spring 20 has been shown with a shape in the arc of a circle between its two junction points, but it is clear that it could have any other contour depending upon design requirements, without departing from the scope of the present invention.

As can be seen in the perspective diagram in FIG. 1, the angle formed by axis 6 with pivoting point 14*a* and point of abutment 16*a* is an obtuse angle, slightly less than 180°, meaning that the arm allows driving wheel 5 to rotate freely in one direction, without driving driven wheel 7, and conversely drives driven wheel 7 when driving wheel 5 is rotating in the other direction, as will be described in detail with reference to the second embodiment.

Figure 3:
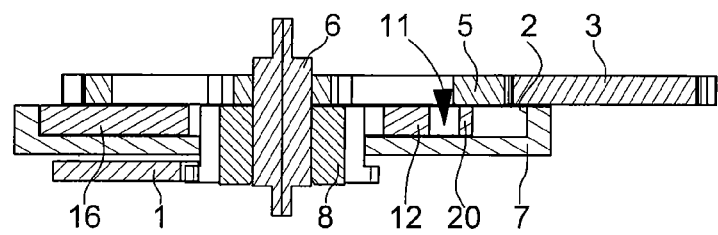
FIG. 3 is a cross-section of a variant of the first embodiment.

The cross-sectional diagram of FIG. 3 concerns a variant of the first embodiment regarding the position of the power take-off on driving wheel 5 and on driven wheel 7. As is clear, it is essential that driving wheel 5 and driven wheel 7 are free to rotate in relation to each other when coupling mechanism 10 is not active. In the example shown, driven wheel 7 no longer has a toothing but it is driven onto an additional pinion 8, which is itself secured to arbour 6, whereas driving wheel 5 remains freely mounted on said arbour 6. The first wheel set 1 of the kinematic chain then meshes with the additional pinion 8. Equally (not shown), additional pinion 8 could be secured to driving wheel 5, and may or may not be driven onto arbour 6, with driven wheel 7 then being freely mounted on said arbour 6. These design variants can simply be imposed by the space that has to be left for the other wheel sets of the timepiece movement.

Figure 4:
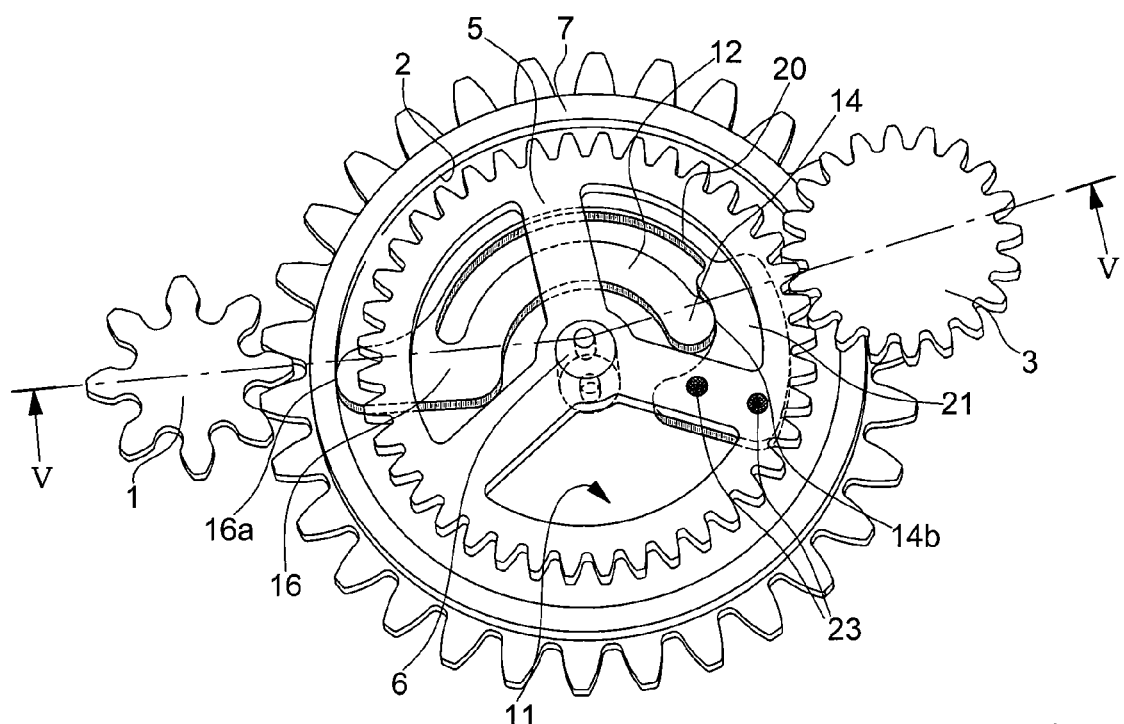
FIG. 4 is a perspective view of a second embodiment.
Figure 5:
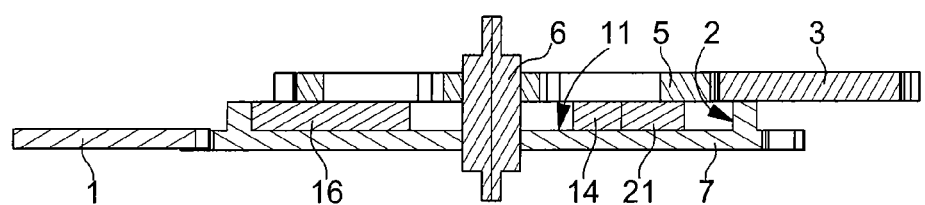
FIG. 5 is a broken cross-section along line V-V of FIG. 4.

With reference now to FIGS. 4 and 5, a second embodiment will now be described below, which differs from that previously described in the arrangement of coupling device 10. The common construction details will not therefore be described further and will bear the same references.

As can be seen in FIG. 4, the foot 14 of locking arm 12 is no longer pivoting in driving wheel 5, but its pivoting point 14*b* can move on the edge of a guide cam 21, formed by a plate secured to driving wheel 5, for example by means of two pins 23. Spring 20 connects head 16 and cam 21 to keep point of abutment 16*a* in contact with wall 2 of dome 11. The contour of cam 21 is designed to reduce to a minimum the "dead angle", i.e. the angle that driving wheel 5 has to travel before driving driven wheel 7. With the coupling device according to the invention, this dead angle is reduced to a value of less than 2°, whereas it is of the order of 26° in the reverser mechanisms of the prior art.

The curvature of the cam is for example of the exponential type, but other choices within the grasp of those skilled in the art are possible. The operation of this coupling mechanism is explained below after the description of a first variant of this second embodiment.

Figure 6:
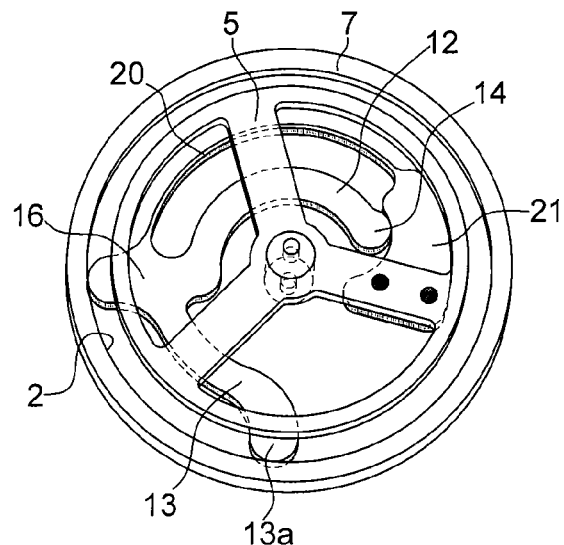
FIG. 6 shows in perspective a first variant of the second embodiment.

FIG. 6 is a simplified diagram of a first variant of the second embodiment. As can be seen, head 16 of locking arm 12 is extended, opposite the junction with spring 20, by a guide extension 13 forming a third point of abutment 13*a* on wall 2 of dome 11 for better controlling the positioning of the locking point of abutment 16*a*. This variant will be used again below in order to explain better the operation of the reverser mechanism according to the invention.

Figure 7:
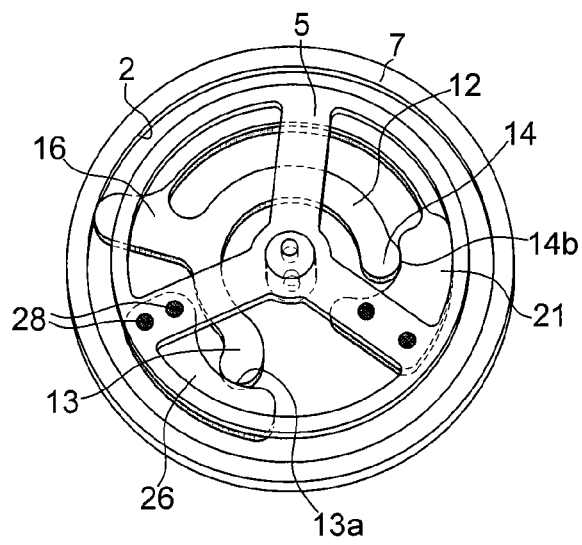
FIG. 7 shows in perspective a second variant of the second embodiment.

FIG. 7 is a simplified diagram of a second variant which differs from the preceding variant in that guide extension 13 is no longer guided by wall 2 of dome 11 but by a guide plate 26 located in dome 11, below driving wheel 5 and secured thereto for example by means of pins 28.

Figure 8:
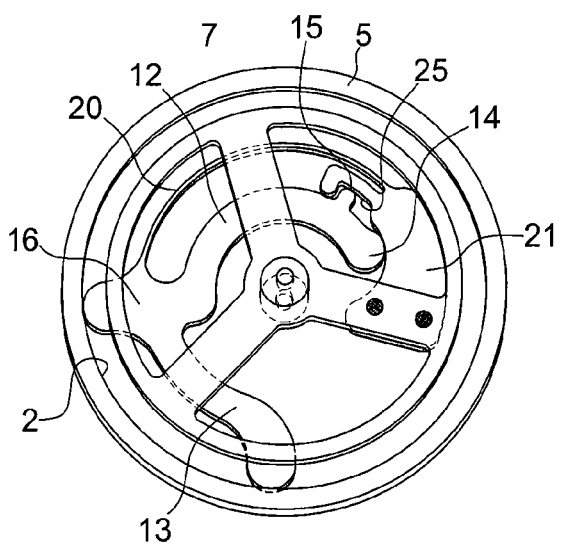
FIG. 8 shows in perspective a third variant of the second embodiment.

FIG. 8 is a simplified diagram of a third variant, which can also integrate one or the other of the preceding two variants. In this variant, a security device is provided to prevent pivoting point 14*b* from leaving cam 21 in the event of large travels of driving wheel 5. This security device consists, in the example shown, of a beak 15, formed from foot 14 of locking arm 12, which cooperates with a recess 25 formed in an extension of the plate forming cam 21. Those skilled in the art can of course devise another arrangement of this security device, without departing from the scope of the present invention.

Figure 9:
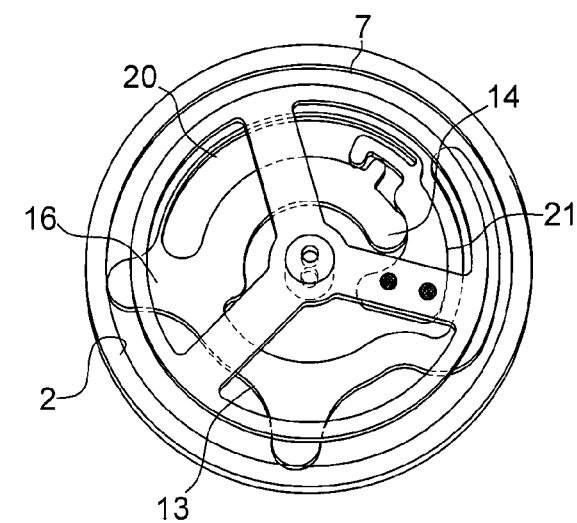
FIG. 9 shows in perspective a fourth variant of the second embodiment.

FIG. 9 is a simplified diagram of a fourth variant that can also integrate the preceding variants. In a known manner, it is desirable for the centre of gravity of a moving part to coincide with its axis of rotation to prevent unbalance detrimental to the yield of the device. In the constructions that have just been described, it is clear that the centre of gravity of the assembly forming coupling device 10 cannot coincide with arbour 6. This fourth variant overcomes this drawback by providing at least one balancing extension 17, whose geometry is calculated to cause the centre of gravity of coupling device to coincide with the centre of the arbour 6. Depending upon the shape of locking arm 12, it is also possible to provide more than one balancing extension.

The coupling device that has just been described, according to one or other of the embodiments, is a monobloc device made of a material that must have a certain elasticity because of spring 20. It may be manufactured in metal or an alloy by known micro-machining methods, such as laser cutting, wire electroerosion, or by methods used for manufacturing MEMs, such as the LIGA technique. The material used can also be non-metallic, such as silicon, silicon dioxide, glass, or other silicon compounds, quartz or diamond, using for example mask and etch methods to obtain the desired contour. These manufacturing methods are well known to those skilled in the art and thus will not be described further.

Reference will now be made to FIGS. 10, 11 and 12 to explain the operation of the reverser device described previously in the variant of FIG. 6.

FIG. 10 shows coupling device 10, after guide cam 21 has been fixed in driving wheel 5 by means of pins 23, but prior to being definitively set in place in dome 11 of driven wheel 7. As can be seen, foot 14 of arm 12 is not in contact with cam 21, and head 16 and the end of guide extension 13 extend beyond inner wall 2 of dome 11. When definitively mounted, spring 20 will force head 16 and guide extension 13 to abut against inner wall 11*a* of dome 11.

In order to facilitate handling prior to assembly and to avoid deforming coupling device 10 outside the plane, a bridge of material 18 could be formed, during manufacture and as shown in FIG. 10, between foot 14 and cam 21, said bridge 18 then being destroyed just prior to the final assembly.

FIG. 11 shows the same coupling device, after assembly, when the device is being driven in rotation in the "free direction", i.e. when driving wheel 5 is rotating in the clockwise direction indicated by the arrow at the centre, without driving driven wheel 7. In fact, the pressure exerted by head 16 of locking arm 12 and by guide extension 13 (represented by the small arrows) on inner wall 2 of dome 11 is not sufficient and only slides the contact points along said inner wall 2.

Conversely, as shown in FIG. 12, when driving wheel 5 is rotating in the anticlockwise direction indicated by the arrow at the centre, the pressure exerted by head 16 is sufficient to cause a blockage and to drive driven wheel 7. As can be seen, the end of the guide extension moves away slightly from wall 2 of dome 11, the gap being exaggerated in FIG. 12. Likewise, the point of contact of foot 14 moves slightly along cam 21 in the opposite direction to the direction of rotation of driving wheel 5 to increase the locking effect.

With reference now to FIGS. 13 to 16, a third and fourth embodiment will be described below concerning a "double direction" reverser mechanism, which basically consists in coupling a first single direction reverser mechanism, whose references will be followed by the letter "a", and a second single direction reverser mechanism whose references will be followed by the letter "b".

Figure 13:
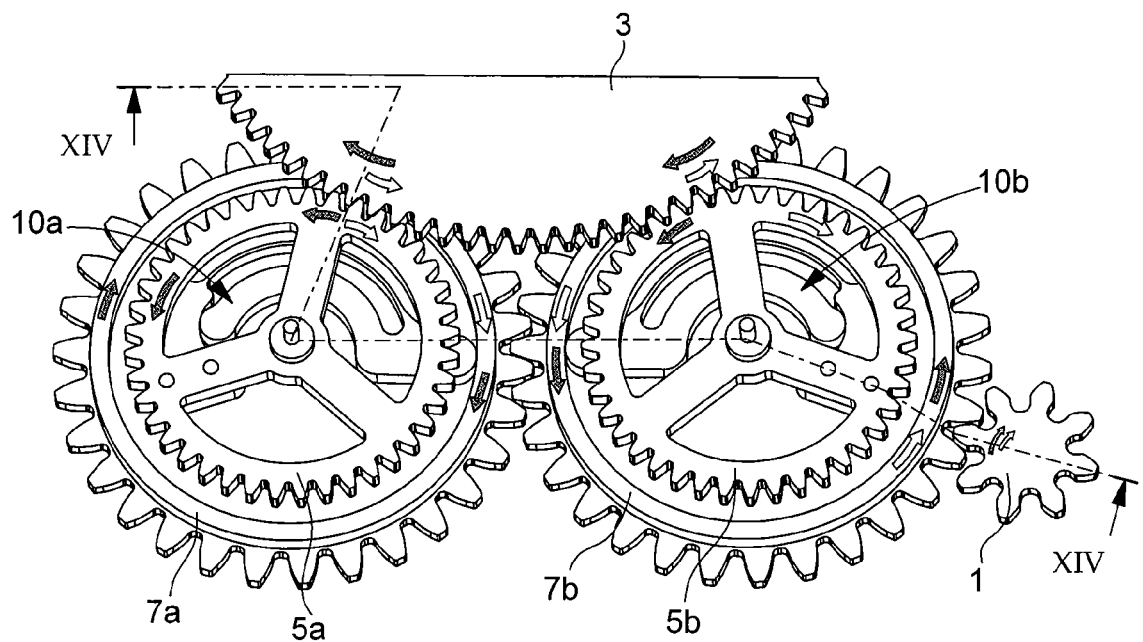
FIG. 13 is a perspective view of a third embodiment.
Figure 14:
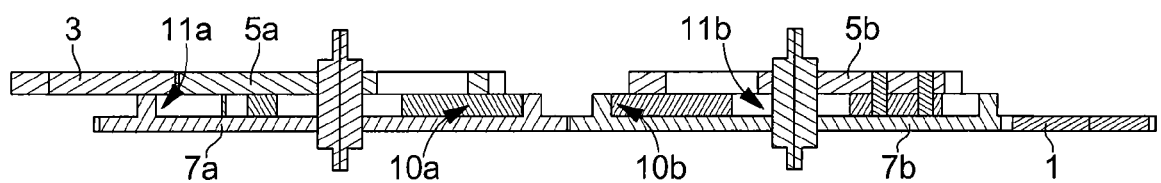
FIG. 14 is a broken cross-section along line XIV-XIV of FIG. 13.

According to the third embodiment, shown in FIGS. 13 and 14, the two reverser mechanisms are located in the same plane, driving wheels 5a, 5b both mesh with drive pinion 3, the driven wheels 7a, 7b mesh with each other and coupling devices 10a, 10b are arranged in their respective domes 11a, 11b to have opposite actions. In this construction, coupling devices 10a, 10b are mirror images of each other. It is clear that other arrangements are possible, without departing from the scope of the invention, for example by using an intermediate wheel which would allow them to be arranged either in a planar manner, or in a superposed manner, with coupling devices 10a, 10b then having the same orientation.

In FIG. 13, a full arrow represents the direction of rotation of the wheel sets when the alternation of drive pinion 3 occurs in the clockwise direction, and by a double line arrow, when the alternation occurs in the opposite direction.

When the alternation occurs in the clockwise direction, pinion 3 drives driving wheel 5b which in turn by locking drives driven wheel 7b, which itself drives the first pinion 1 of the kinematic chain in the clockwise direction. The driven wheel 7b also meshes with driven wheel 7b and its rotation is in fact not disturbed by driving wheel 5a which is also driven by drive pinion 3, but which rotates in the opposite direction to driving wheel 5b while being free to rotate.

When drive pinion 3 has an opposite alternation in the anticlockwise direction, it can be seen that the first wheel set 1 of the kinematic chain is still driven in the same direction by driven wheel 7b, itself driven by driven wheel 7a, itself driven by locking by driving wheel 5a, driving wheel 5b of the second mechanism 10b being free to rotate relative to driven wheel 7b.

Figure 15:
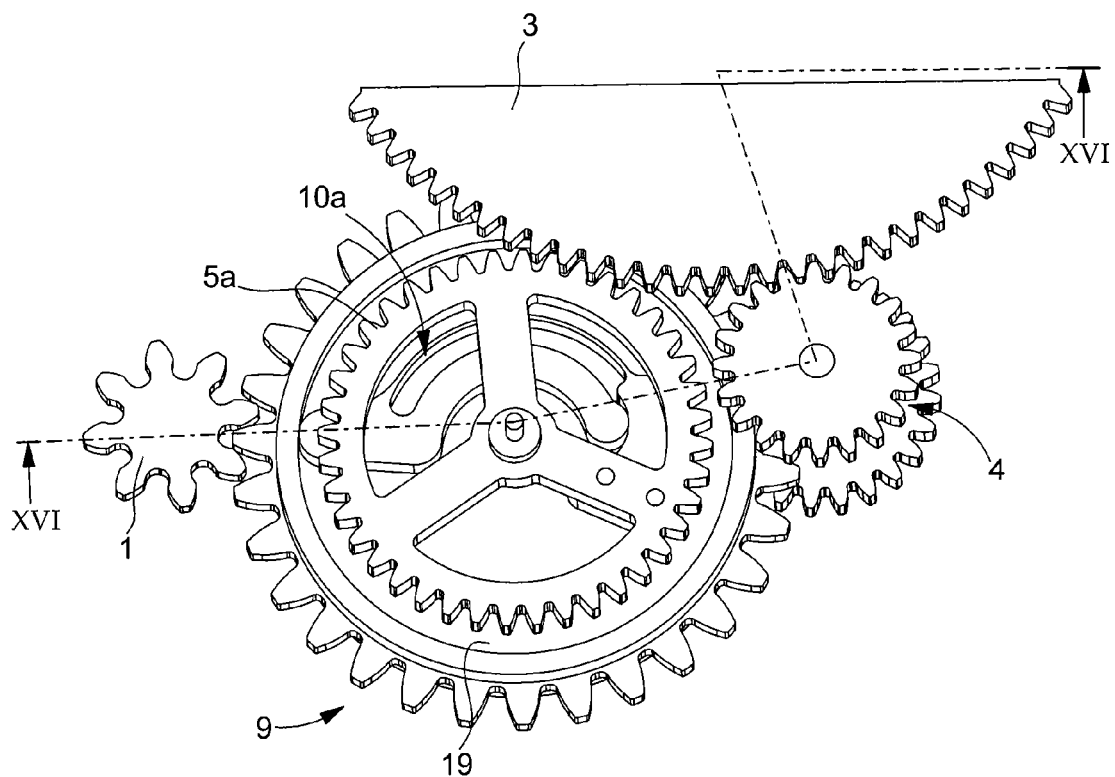
FIG. 15 is a perspective view of a fourth embodiment.
Figure 16:
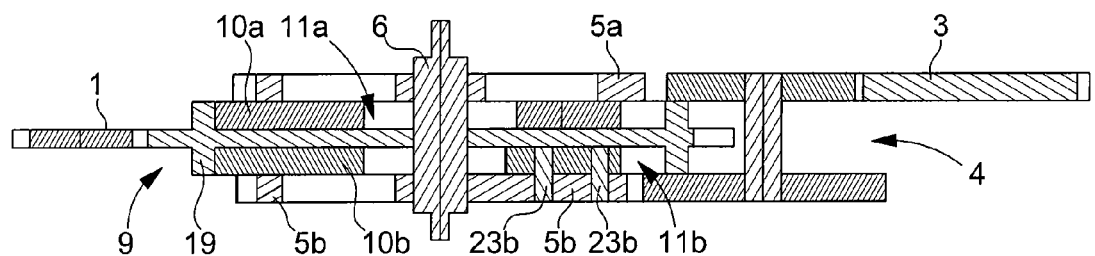
FIG. 16 is a broken cross-section along line XVI-XVI of FIG. 15.

FIGS. 15 and 16 describe a fourth embodiment that can also be included as a variant of the preceding embodiment when the two coupling mechanisms are superposed. As can be seen, drive pinion 3 meshes with driving wheel 5a of the first coupling mechanism and, via an intermediate wheel 4, with driving wheel 5b of the second coupling mechanism. This fourth embodiment is characterized in that driven wheels 7a and 7b form a junction plate 9 on either side of which domes 11a and 11b are formed, to receive mechanisms 10a and 10b, which in this case have the same orientation, but have opposite actions because of intermediate wheel 4. The working will not be explained since it follows naturally from the description of the third embodiment.

This type of reverser mechanism could be used in any small portable apparatus for powering its mechanical or electrical energy source, such as a wristwatch, when the drive pinion is driven by an oscillating weight. It can also find other applications, for example for the winding stem by providing a conical pinion gear.

The invention is not limited to the embodiments that have just been described, since those skilled in the art can adapt them as required, for example for a particular watch calibre or for a non-horological application.

What is claimed is:

1. A single direction reverser mechanism for the unidirectional driving of an first wheel set of a kinematic chain including a drive pinion with an oscillating movement meshed with a driving wheel mounted on an arbour above a driven wheel mounted on the same arbour, meshed, directly or indirectly, with said first wheel set of the kinematic chain, and including a dome open towards the driving wheel to house a coupling device, made of a resilient material for coupling/uncoupling the two wheels as a function of the direction of rotation of the drive pinion, wherein said coupling device includes at least one locking arm one end of which has a pivoting point on the driving wheel and the other end of which has a point of abutment against an inner wall of the dome of the driven wheel via the action of a spring.

2. The reverser mechanism according to claim 1, wherein the spring and the arm are made in a single piece.

3. The reverser mechanism according to claim 1, wherein the pivoting point is formed by an arbour fixed in the driving wheel and about which the locking arm is mobile.

4. The reverser mechanism according to claim 1, wherein the pivoting point is formed by a cam fixed in the driving wheel and along which the pivoting point can move.

5. The reverser mechanism according to claim 4, wherein the contour of the cam corresponds to a portion of an exponential spiral.

6. The reverser mechanism according to claim 4, wherein the locking arm includes, opposite the point of abutment, a guide extension, the end of which cooperates with the wall of the dome.

7. The reverser mechanism according to claim 4, wherein the locking arm includes, opposite the abutment point, a guide extension, the end of which cooperates with a guide plate fixed in the driving wheel.

8. The reverser mechanism according to claim 4, wherein it includes a security device limiting the travel of the pivoting point along the cam.

9. The Reverser mechanism according to claim 8, wherein the security mechanism consists of a beak which cooperates with a recess, said beak and recess being formed respectively from the end of the locking arm abutting the cam and a non-active portion of the cam or vice versa.

10. The reverser mechanism according to claim 3, wherein the locking arm further includes a balance extension for making the centre of gravity of the coupling device coincide with the arbour of the wheels.

11. The reverser mechanism according to claim 1, wherein the driving wheel and the driven wheel are both freely mounted on the arbour each being provided with a toothing respectively meshing with the drive pinion and the first wheel set of the kinematic chain.

12. The reverser mechanism according to claim 1, wherein one wheel is freely mounted on the arbour and provided with a toothing meshing with the drive pinion or the first wheel set of the kinematic chain, the other wheel being driven onto the arbour of rotation, meshing with the first wheel set or the drive pinion either by means of its own toothing, or by means of an additional pinion that is also secured to the arbour.

13. The reverser mechanism according to claim 1, wherein the drive pinion is set in motion by an oscillating weight.

14. A double direction reverser mechanism, wherein it includes two single direction reverser mechanism according to claim 1, arranged in the same plane, whose driving wheels each mesh with the drive pinion with an oscillating motion, whose driven wheels mesh with each other, and whose coupling devices have opposite actions.

15. A double direction reverser mechanism, wherein it includes two single direction reverser mechanism according to claim 1, arranged one above the other, one of the driving wheels being directly meshed with the drive pinion and the other driving wheel being meshed with an intermediate wheel itself meshed with the drive pinion, the coupling devices having opposite actions.

16. The double direction reverser mechanism according to claim 15, wherein the driven wheels form a single piece whose domes are arranged on either side of a junction plate.

17. The reverser mechanism according to claim 1, wherein the resilient material is selected from among metals or alloys, or crystalline or amorphous materials, such as silicon and silicon derivatives, or quartz.

18. A timepiece including a reverser mechanism for the unidirectional driving of the first wheel set of a kinematic chain including a drive pinion with an oscillating movement meshed with a driving wheel mounted on an arbour above a driven wheel mounted on the same arbour, meshed, directly or indirectly, with said first wheel set of the kinematic chain, and including a dome open towards the driving wheel to house a coupling device, made of a resilient material for coupling/uncoupling the two wheels as a function of the direction of rotation of the drive pinion, wherein said coupling device includes at least one locking arm one end of which has a pivoting point on the driving wheel and the other end of which has a point of abutment against the inner wall of the dome of the driven wheel via the action of a spring.

19. The timepiece according to claim 18, wherein the kinematic chain automatically winds the barrel of a mechanical movement.

* * * * *